(12) United States Patent
Milich

(10) Patent No.: US 6,786,142 B2
(45) Date of Patent: Sep. 7, 2004

(54) MANUALLY OPERATED NUT-CRACKING DEVICE

(76) Inventor: Sam Milich, 81 Birdlife Court, Nerang, Queensland, 4211 (AU)

( * ) Notice: Subject to any disclaimer, the term of this patent is extended or adjusted under 35 U.S.C. 154(b) by 0 days.

(21) Appl. No.: 10/704,563

(22) Filed: Nov. 12, 2003

(65) Prior Publication Data

US 2004/0094044 A1 May 20, 2004

(30) Foreign Application Priority Data

Nov. 11, 2002 (AU) .................................... 2002344409

(51) Int. Cl.[7] ............................................... A23N 5/00
(52) U.S. Cl. ............................ 99/572; 99/577; 99/579; 99/581
(58) Field of Search .......................... 99/538–540, 567, 99/600, 568–581, 583, 582; 426/481, 482; 30/120.1–120.5

(56) References Cited

U.S. PATENT DOCUMENTS

| | | | | |
|---|---|---|---|---|
| 1,351,983 A | * | 9/1920 | Allen et al. ................ | 30/120.5 |
| 1,665,557 A | * | 4/1928 | Miller ........................ | 99/579 |
| 1,791,992 A | * | 2/1931 | Wiemers ................... | 30/120.5 |
| 2,740,439 A | * | 5/1956 | Dillard ...................... | 99/579 |
| 3,105,532 A | * | 10/1963 | Weems ...................... | 99/577 |
| 3,310,083 A | * | 3/1967 | Jennings .................... | 99/579 |
| 3,311,143 A | * | 3/1967 | Vetter ........................ | 99/579 |
| 3,578,047 A | * | 5/1971 | Diggs ........................ | 99/572 |
| 4,255,855 A | | 3/1981 | Brazil | |
| 4,370,922 A | * | 2/1983 | Rollband ................... | 99/572 |
| 4,466,343 A | * | 8/1984 | Thompson ................ | 99/572 |
| 4,787,307 A | * | 11/1988 | Rollband ................... | 99/572 |
| 4,838,155 A | * | 6/1989 | Steffel ....................... | 99/572 |
| 4,843,715 A | | 7/1989 | Truax | |
| 5,012,580 A | | 5/1991 | Goulter | |
| 5,092,231 A | * | 3/1992 | Smith ........................ | 99/572 |

FOREIGN PATENT DOCUMENTS

AU         648744         4/1994

* cited by examiner

Primary Examiner—Timothy F. Simone
(74) Attorney, Agent, or Firm—Young & Thompson

(57) ABSTRACT

Provided is a manually operable nut cracking device having a frame, a fixed jaw and a movable jaw mounted to the frame in opposed relationship to define between them a nut holding station. The movable jaw is biased away from the fixed jaw member. The device also has a lever arm pivotally connected by its proximal end with a pivot shaft to the upper part of the frame such that its distal end forms an operating handle movable form a fully inoperative position whereat the jaws are at their fullest extent away from each other to a fully operative positive whereat the jaws are at their fullest extent closer to one another. The pivot shaft is positioned adjacent to the movable jaw and a wedge shaped cam is formed at the proximal end of the lever arm.

15 Claims, 5 Drawing Sheets

MANUALLY OPERATED NUT-CRACKING DEVICE

FIELD OF THE INVENTION

THIS INVENTION relates to the general field of nut-cracking devices or assemblies, usable to break or crack the shell of a shelled nut fruit so that the nut therein can be removed for consumption purposes, and it has particular but not exclusive reference to a manually operable device for the cracking open of macadamia fruits and similar shelled nuts fruits.

BACKGROUND OF THE INVENTION

Many nut fruits such as macadamia and walnut have a relatively hard shell which must be broken or cracked for accessing the nut therein. The shell is so hard that a mechanical device is required to break or crack it. Nut-cracking devices have been in use for many years, and some have included arrangements where a lever is mounted for movement against one of a pair of juxtaposed jaw members, such as provided in Australian Patent No. 648744. The nut-cracking device disclosed therein does not always provide a satisfactory nut-cracking function, as a substantially large force is required to be applied on the lever to crack harder shells of nut fruits, such as macadamia nut fruits or Queensland nut fruits, or there is insufficient movement of the moving jaws to crack some kinds of nuts. The device also is unnecessarily complicated.

The present invention aims to provide a manually operable nut-cracking device which alleviates the problems of the prior art, is simple, cheap and effective and yet will prove durable and long lasting in use. The present invention also aims to provide improved function in order to allow an operator to use either hand, left or right, and to reduce the distance of travelling of the lever arm from its fully inoperative to its fully operative position whilst also maintaining the cracking action positively and desirably controlled. Other aims and advantages of the invention may hereinafter become apparent.

SUMMARY OF THE INVENTION

With the forgoing in view, my invention resides broadly in a manually operable nut-cracking device including:

a frame having wall means and a mounting base;

a fixed jaw member and a movable jaw member mounted to the wall means in opposed relationship to define between them a nut holding station, the movable jaw member being urged away from the fixed jaw member by biassing means;

a lever arm pivotally connected by its proximal end with a first pivot shaft to an upper part of the wall means such that its distal end forms an operating handle movable between a fully inoperative position whereat the jaws members are at their fullest extent away from one another and a fully operative position whereat the jaws members are at their fullest extent closer to one another; and a wedge shape cam formed on the proximal end of the lever arm;

wherein the first pivot shaft being arranged adjacent to the movable jaw member and the cam being so shaped that when a force is applied to the handle to move the lever arm from its fully inoperative position to a partially operative position intermediate the fully inoperative and the fully operative positions, a relatively greater mechanical advantage is generated between the cam and the movable jaw member than correspondingly when the lever arm is moved from its intermediate position to its fully operative position, whereat the movable jaw member terminating short of the fixed jaw member by a predetermined distance.

The term "mechanical advantage" as used herein means the ratio of the force on the movable jaw member to a force applied to the handle of the lever arm.

Preferably, one or both jaw members have multi-toothed or serrated nut-engaging faces for holding a nut to be cracked, the multi-toothed or serrated faces being outwardly divergent in the nut-receiving station so that a nut can be wedged therein and held between the jaw members.

It is preferred that the wedge shaped cam has an upper portion and a lower portion, and said upper portion is arranged to be relatively closer to the first pivot shaft than said lower portion.

In a preferred form, the movable jaw member is pivotally mounted to the wall means, and has a top end and a lower end. The wedge shaped cam is arranged so that its upper portion engages with the top end of the movable jaw member between the fully inoperative and intermediate positions of the lever arm, and the lower portion of the cam engages with the movable jaw member intermediate its top end and its pivot, whereby it can be seen that a decreased mechanical advantage is traded for a larger relative movement when the lever arm is moved from the intermediate position to the fully operative position.

It is further preferred that said top end of the movable jaw member has a corner proximal to said pivot shaft and said upper portion engages with the proximal corner between the fully inoperative and intermediate positions of the lever arm.

It is also preferred that the travelling of the lever arm from the fully inoperative position to the fully operative position is arranged to extend through substantially ninety degrees.

Preferably the biassing means includes a spring or a resilient pad member arranged to cause the movable jaw member to be biassed in a direction away from the fixed jaw member. More preferably the spring or resilient pad member extends between the two jaw members at or adjacent to the mounting base so that it allows the movable jaw member to be forced to move in the direction of the fixed jaw member against the bias thereof, while additionally the spring or resilient pad member may co-operate with the jaw members to define a base support of the nut-holding station.

The wall means of the frame may have opposed upstanding walls defining a channel therebetween, and the movable and fixed jaw members being arranged in the channel. Each of said walls may have a first wall portion and a second wall portion with a divergent gap therebetween. The fixed jaw member is fixedly secured to said first wall portions and the movable jaw member is pivotally secured to said second wall portions. Preferably, the movable jaw member is pivotally secured to said second wall portions with a second pivot shaft arranged adjacent to the base.

The base may be fixed to a tray so that nuts from the cracked nut fruits can be moved from the nut holding station into the tray. Preferably, the base is fixed to a medial position of the tray so that the device can be operated by left or right handed person.

Feet members or anti-slip buffers may be arranged to support the tray on a surface.

BRIEF DESCRIPTION OF THE DRAWINGS

In order that the present invention may be more readily understood and put into practical effect, reference will now be made to the accompanying drawings which illustrate a preferred embodiment of the invention and wherein other features of the invention may become apparent, wherein.

DETAILED DESCRIPTION OF THE DRAWINGS

Figure 1:
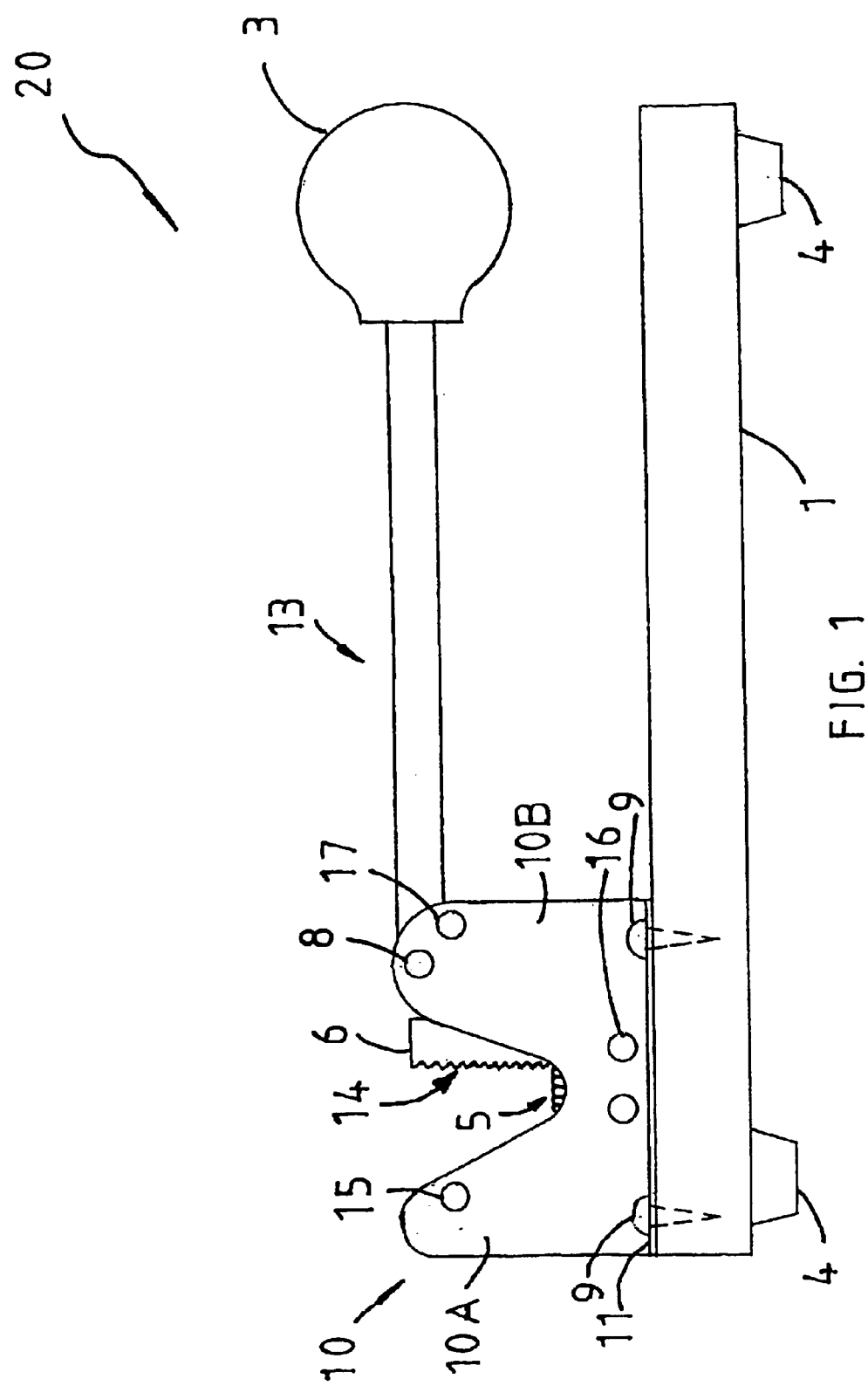
FIG. 1 shows in side elevation one preferred form of manually operable nut-cracking device according to the invention.
Figure 2:
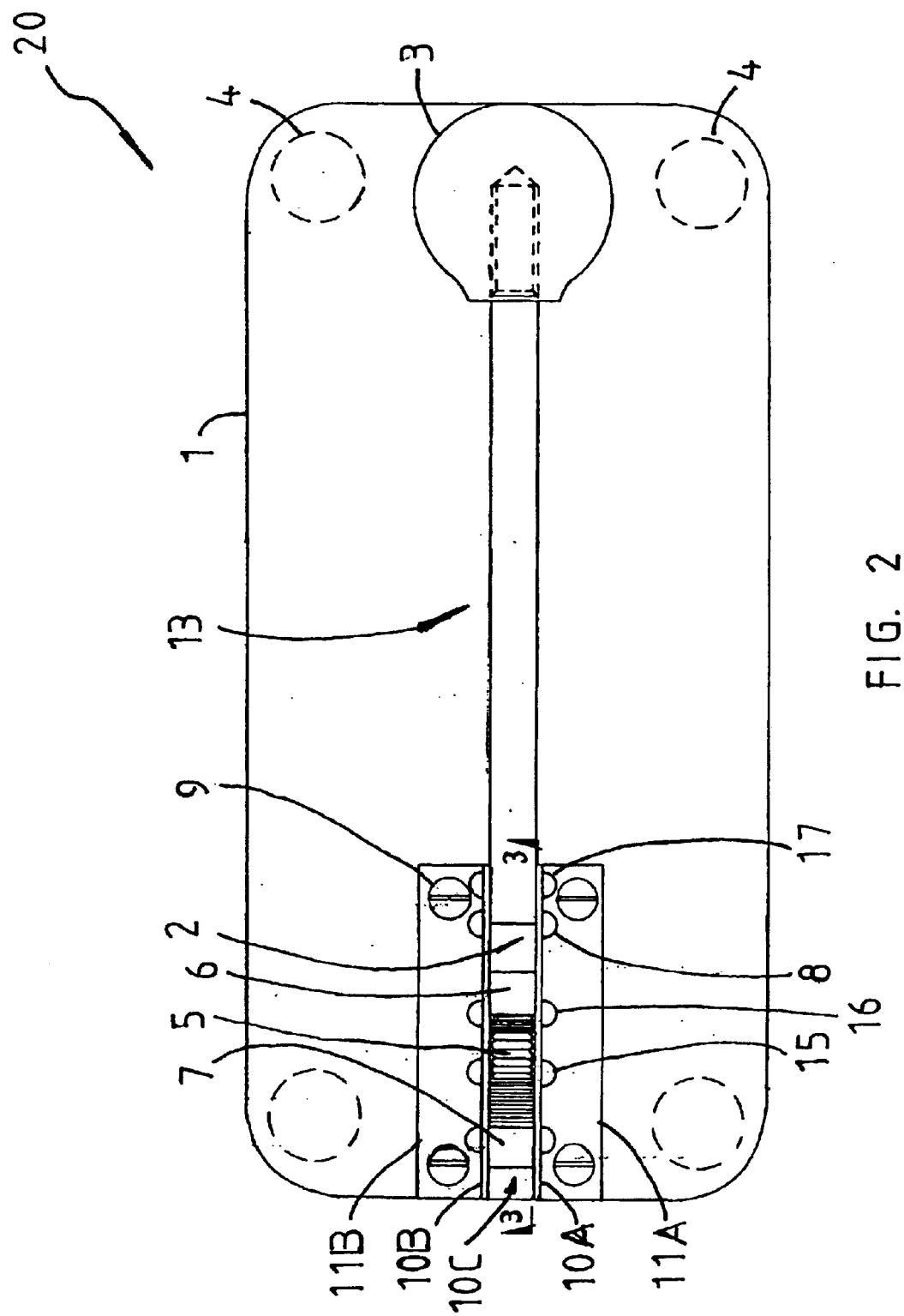
FIG. 2 shows in plan view the assembly illustrated in FIG. 1.

The manually operable nut-cracking device 20 shown in the drawings includes a frame 10 having wall means with opposed walls 10A and 10B arranged with a channel 10C therebetween, and a mounting base with base portions 11A and 11B extending laterally from respective walls 10A and 10B. In this embodiment of the invention the base portions 11A and 11B are fixed to a medial end part of the tray 1 so that the channel 10C is substantially along a middle axis of the tray 1. Arranged in the channel 10C are a fixed jaw member 7 and a movable jaw member 6 defining between them a nut holding station 12. A lever arm 13 is pivotally connected at its proximal end 2 with a pivot shaft 8 to the upper parts of the wall portions 10B of the frame 10 while its distal end constitutes an operating handle 3. Pivotal movement of the lever arm 13 is for the purpose of moving the movable jaw member 6 through a predetermined maximum stroke indicated by the arrow in FIG. 3 from a fully inoperative position to a fully operative position corresponding to the two extreme positions of the movable jaw member 6. At the end of the stroke in the direction towards the fixed jaw member 7 the movable jaw member 6 terminates short of the former as shown in FIG. 4. A pin 17 is provided to limit movements of the lever arm 13 between the two extreme positions as shown respectively in FIGS. 3 and 4.

Figure 3:
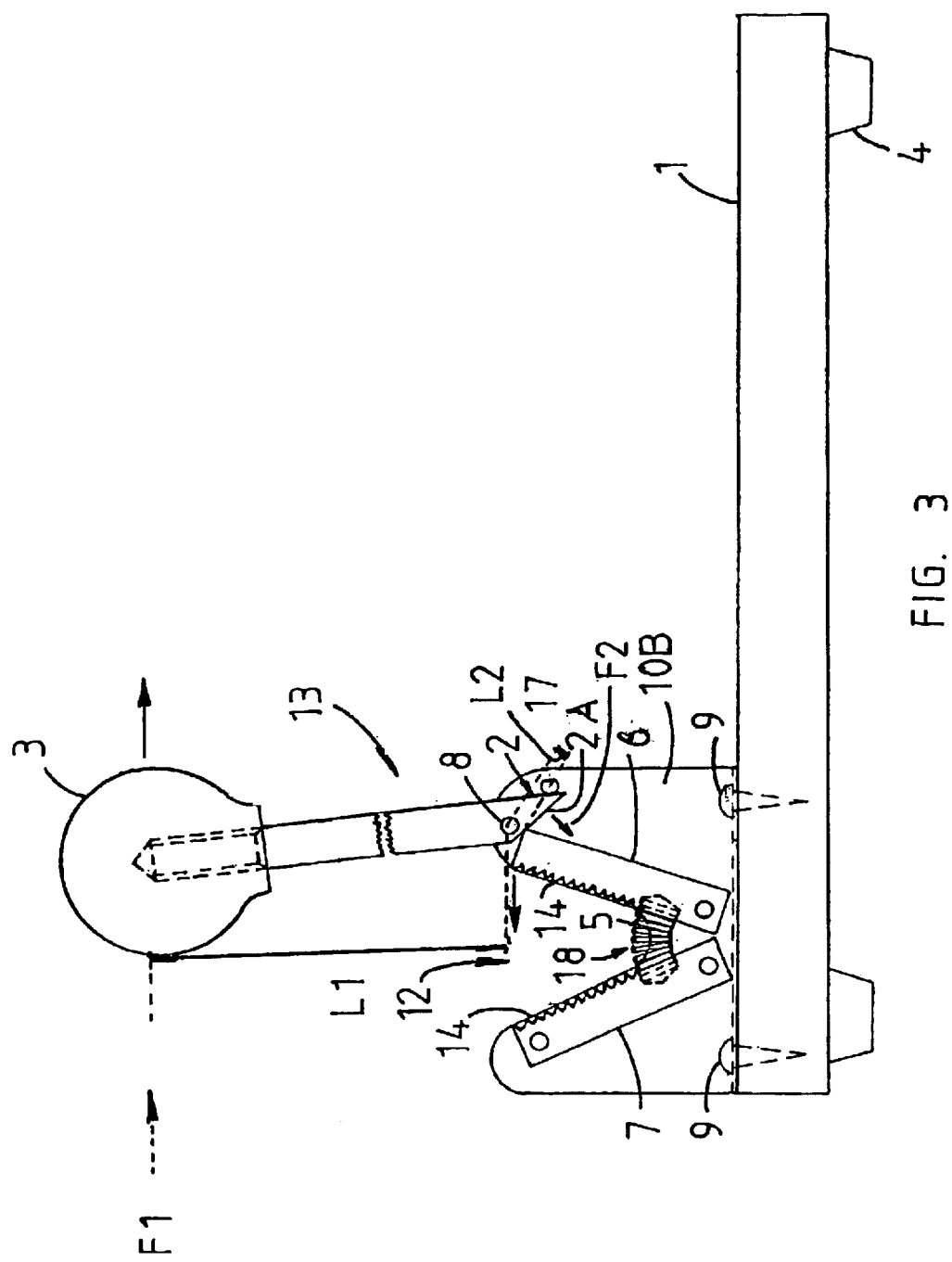
FIG. 3 is a fragmentary cross-sectional elevation on the line 3—3 of FIG. 2 showing the two jaw members and the action of the wedge shaped cam means on the movable jaw member in the fully inoperative position.
Figure 4:
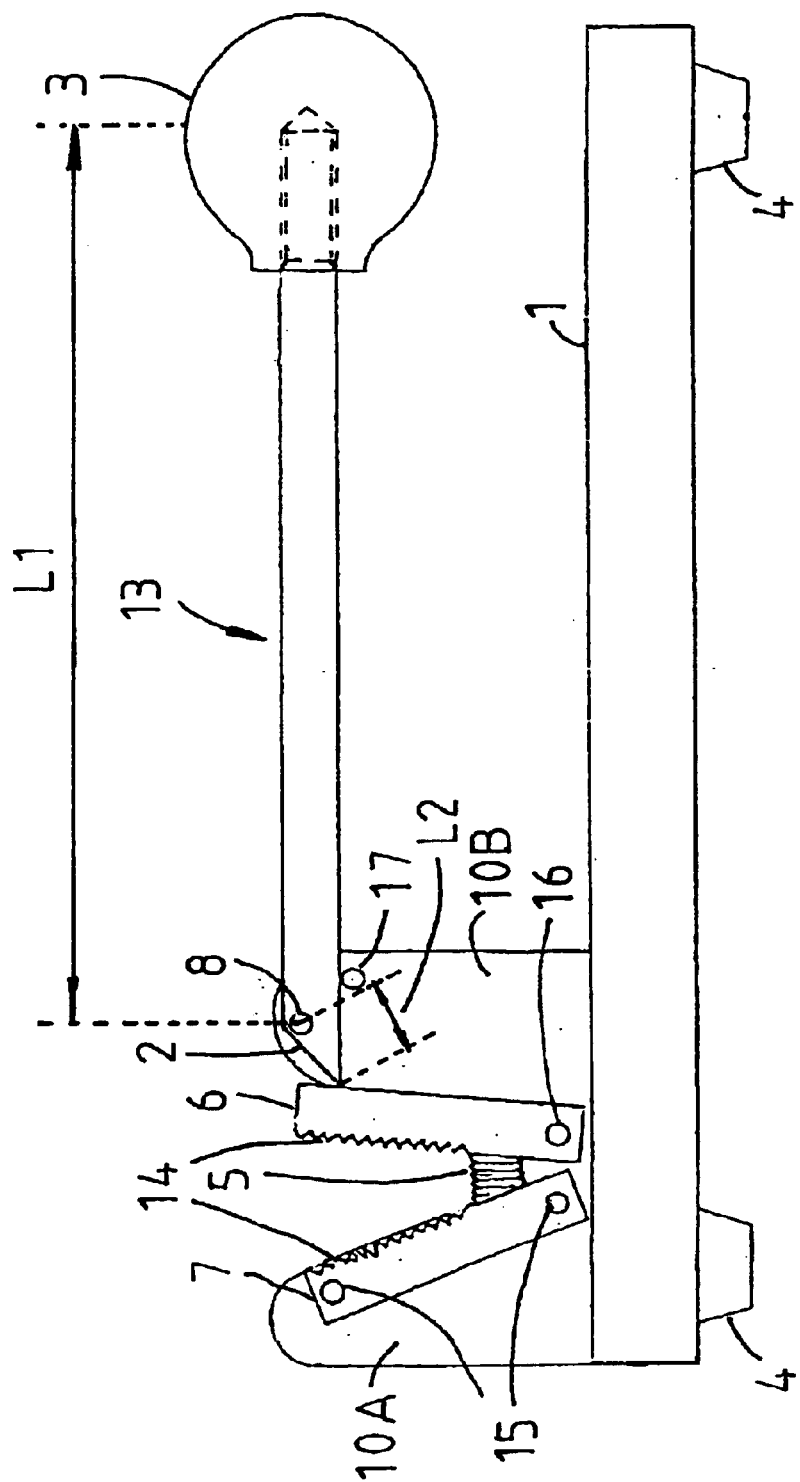
FIG. 4 shows the device of FIG. 3 in the fully operative position.

The basic components described are so made and arranged that the lever arm 13 may be pivoted through approximately 90 degrees from the fully inoperative position illustrated in FIG. 3 so that it reaches fully inoperative position at which the nut holding station 12 between the jaw members 6,7 will be opened out to an extent sufficiently wide to receive and hold a full uncracked nut. Thereafter a force may be applied to the handle 3 to forcibly move the lever arm 13 to pivot from the fully inoperative position as shown in FIG. 3 towards the fully operative position shown in FIG. 4 to the extent necessary to cause cracking of the shell of the nut held in the nut holding station 12.

In the illustrated embodiment, the frame 10 has its mounting base 11 secured by four screws 9 to the tray 1. The lever arm 13 is pivotable in a plane at substantially right angles to the tray 1 and the device 20 is best oriented such that the handle 3 can swing towards or away from the operator located in front of the tray 1, while the movable jaw member 6 travels generally in the opposite direction of the lever arm 13 towards the fixed jaw member 7, but terminating short thereof. There are four rubber-like anti-slip buffers 4, one under each corner of the tray 1.

The two jaw members 6,7 have multi-toothed or serrated nut engaging faces 14 opposing one another for holding a nut to be shelled at the nut holding station 12. These faces 14 are outwardly divergent in the inoperative position of the movable jaw member 6 so that a nut selected from a range of sizes can be wedged in between the jaws and held there for cracking. In practice, the movable jaw member 6 is at the front of the fixed jaw member 7 and nearer the operator's position.

A wedge shape cam 2A is arranged at the proximal end 2 of the lever arm 13 and is in contact with the movable jaw member 6 at the front end of the upper part of the frame 10 as illustrated.

Other preferred features will be apparent from the drawings. For example, the movable jaw member 6 is connected pivotally about a second pivot shaft 16 to the walls 10A and 10B, and a resilient pad member 5 is interposed between the jaw members 6,7 to cause the movable jaw member 6 to be biassed in the direction away from the fixed jaw member 7. When the movable jaw member 6 is forced in the closing direction it moves against the resilient bias, while additionally the resilient pad member 5 co-operates with the two jaw members 6,7 to define a base support 18 of the nut holding station 12 as apparent from FIG. 3 in the inoperative position. The fixed jaw member 7 is fixed to the walls 10A and 10B by means of fixing means such as rivets or bolts 15. Each of the walls 10A and 10B in this embodiment is substantially M-shaped with a gap corresponding to the hut holding station 12.

Figure 5:
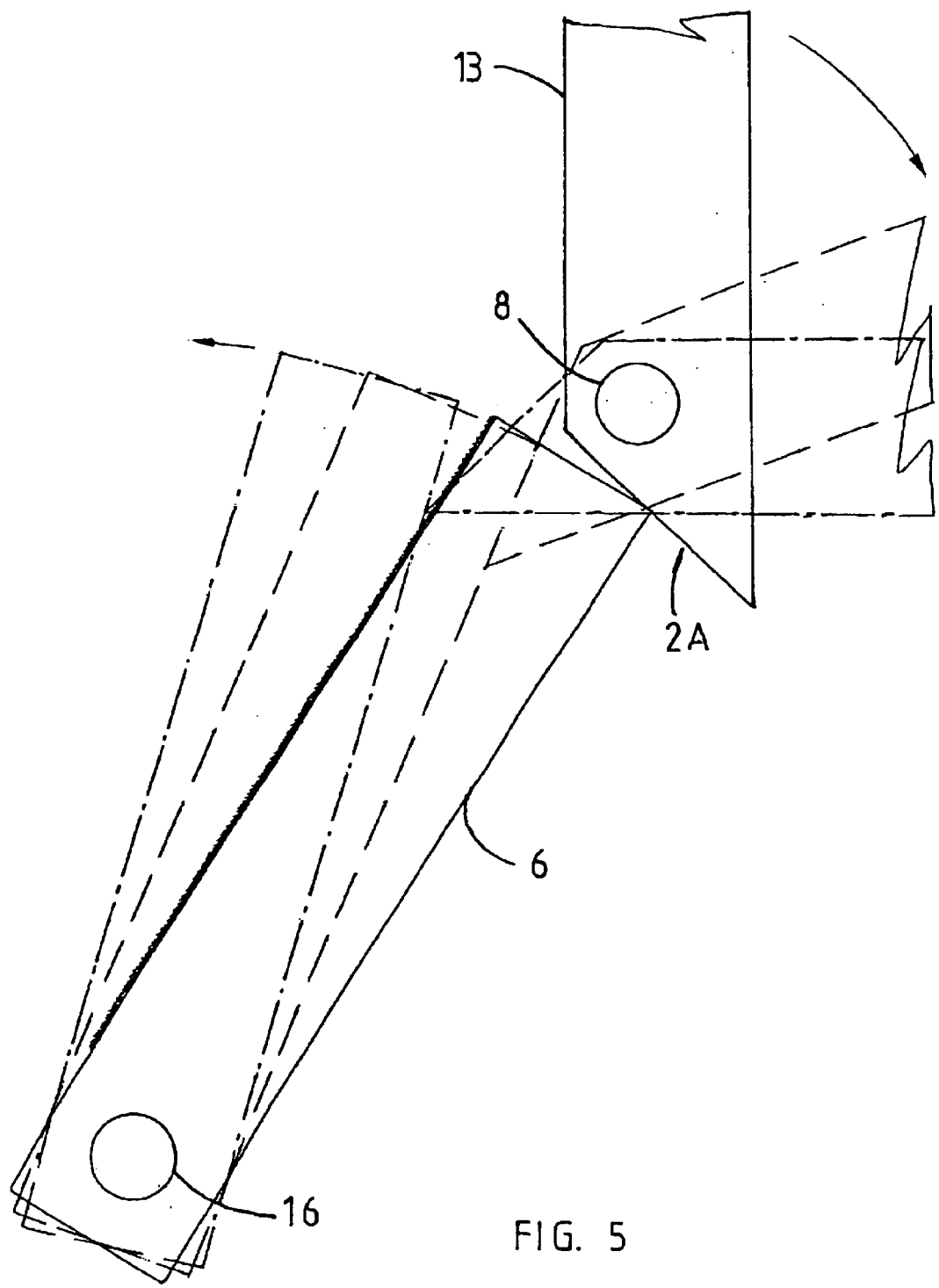
FIG. 5 shows the relationship between the cam means and the movable jaw member from the fully inoperative position through a partial operative position to the fully operative position.

When a force $F_1$ is applied the handle 3 to move the lever arm 13 in a clockwise direction as shown in FIG. 3, moment $M_1$ due to force $F_1$ is $F_1 \times L_1$, $L_1$ being the distance between the point of the application of the force $F_1$ and the fulcrum which is the pivotal axis at the pivot shaft 8. An equal and opposite moment $M_2$ is generated on the movable jaw member 6 at the point of contact with the cam 2A. $M_2$ is equal to $F_2 \times L_2$ where $F_2$ is an reactive force on the movable jaw member 6 and $L_2$ is the distance from the point of contact of the cam 2A with the movable jaw member 6 to the fulcrum. Thus $F_1 \times L_1 = F_2 \times L_2$. When the ratio of $L_1$ to $L_2$ is large a relatively smaller force $F_1$ is required to generate a moment $M_2$ to move the movable jaw member 6 to cause the shell of a nut to crack, and therefore a greater mechanical advantage is generated. In this embodiment of the invention, the cam 2A is wedge shaped and slopes downwardly away from the movable jaw member 6. The point of contact between the cam 2A and the movable jaw member 6 in the fully inoperative position is in an upper portion of the cam 2A and below the fulcrum 8. As the lever arm 13 moves towards the fully operative position the point of contact shifts progressively to the lower portion of the cam 2A. Consequently, the ratio of $L_1$ to $L_2$ is progressively reducing and consequently, the mechanical advantage is progressively reducing. FIG. 5 shows the changing points of the contact between the cam 2A and the movable jaw member 6 from when the lever arm 13 is about vertical to the intermediate operative position through to the fully operative position. In FIG. 5, the full lines correspond to the positions of the lever arm and the movable jaw member 6 when the lever arm 13 is vertical, the dash lines correspond to their positions in the immediate operative position, and the dot-dash lines correspond to their positions in the fully operative position. As can be seen, in the immediate operation position, the upper and lower portions of the cam 2A are in contact with the movable jaw members. Thereafter, the lower tip of the cam 2A is in contact with the movable jaw member 6 and as such L2 is considerably larger than when the upper tip of the cam 2A is in contact with the member 6. Consequently, the mechanical advantage is reduced when the lever arm 13 moves past the intermediate operative position a force is applied thereto to crack the shell of a nut fruit. The reduced mechanical advantage is beneficial in that it minimises damage to nuts following cracking of the shells of the nut fruits.

In use, the manually operable nut-cracking device can be designed to cater for nuts within a wide range in sizes, especially macadamia nuts of all sizes, with the exception of walnuts which would normally be too large when the device 20 is designed for macadamia nuts. The lever action will be found to be positive, with little effort being required, but at the same time there will be sensitivity in the action permitting the operator to stop the leverage as soon as cracking of the shell occurs.

Whilst the above has been given by way of illustrative example of the present invention many variations and modifications thereto will be apparent to those skilled in the art without departing from the broad ambit and scope of the invention as herein set forth in the appended claims.

What is claimed is:

1. A manually operable nut-cracking device comprising:
   a frame having wall means and a mounting base;
   a fixed jaw member and a movable jaw member mounted to the wall means in opposed relationship to define between them a nut holding station, the movable jaw member being urged away from the fixed jaw member by biassing means;
   a lever arm pivotally connected by its proximal end with a first pivot shaft to an upper part of the wall means such that its distal end forms an operating handle movable between a fully inoperative position whereat the jaws are at their fullest extent away from one another and a fully operative position whereat the jaws are at their fullest extent closer to one another;
   a wedge shaped cam formed on the proximal end of the lever arm;
   wherein the pivot shaft being arranged adjacent to the movable jaw member and the cam being so shaped that when a force is applied to the handle to move the lever arm from its fully inoperative position to a partially operative position intermediate the fully inoperative and fully operative positions, a relatively greater mechanical advantage is generated between the cam and the movable jaw member than correspondingly when the lever arm is moved from its intermediate position to its fully operative position, whereat the movable jaw member terminating short of the fixed jaw member by a predetermined distance.

2. The device according to claim 1 wherein one of or both said jaw members have multi-toothed or serrated nut engaging faces for holding a nut to be cracked, the multi-toothed or serrated faces being outwardly divergent in the nut receiving station so that a nut can be wedged therein and held between the jaw members.

3. The device according to claim 1 wherein travelling of the lever arm from the fully inoperative position to the fully operative position is substantially ninety degrees.

4. The device according to claim 1 wherein the wedge shaped cam has an upper portion and a lower portion, and said upper portion is arranged to be relatively closer to the first pivot shaft than said lower portion.

5. The device according to claim 4 wherein the movable jaw member having a top end and a lower end, and being pivotally mounted to the wall means, the wedge shaped cam being arranged so that its upper portion engages with the top end of the movable jaw member between the fully inoperative and intermediate positions of the lever arm, and the lower portion of the cam engages with the movable jaw member intermediate its top end and its pivot.

6. The device according to claim 5 wherein said top end of the movable jaw member having a corner proximal to said pivot shaft and said upper portion engages with the proximal corner between the fully inoperative and intermediate positions of the lever arm.

7. The device according to claim 1 wherein the biassing means including a spring or a resilient pad member arranged to cause the movable jaw member to be biassed in a direction away from the fixed jaw member.

8. The device according to claim 7 wherein the spring or resilient pad member being arranged to extend between the jaw members at or adjacent to the mounting base for allowing the movable jaw member to be forced to move a direction towards the fixed jaw member against the bias thereof.

9. The device according to claim 8 wherein the spring or resilient pad member being arranged to co-operate with the jaw members to define a base support for a nut fruit in said nut-holding station.

10. The device according to claim 1 wherein the wall means of the frame having opposed upstanding walls arranged to define a channel therebetween, and the movable and fixed jaw members being arranged in the channel.

11. The device according to claim 10 wherein each of said walls having a first wall portion and a second wall portion with a divergent gap therebetwen, the fixed jaw member being fixedly secured to said first wall portions and the movable jaw member being pivotally secured to said second wall portions.

12. The device according to claim 11 wherein the movable jaw member is pivotally secured to said second wall portions with a second pivot shaft arranged adjacent to the mounting base.

13. The device according to claim 1 wherein the mounting base is fixed to a tray so that nuts from cracked nut fruits can be moved from the nut holding station into the tray.

14. The device according to claim 13 wherein the base being fixed to a medial position of the tray so that the handle can be operated by a left or right handed person.

15. The device according to claim 13 wherein the tray having feet members or anti-slip buffers arranged to support the tray on a surface.

* * * * *